United States Patent [19]

Martin

[11] Patent Number: 4,575,605
[45] Date of Patent: Mar. 11, 1986

[54] APPARATUS AND METHOD FOR DETECTING THE LOCATION OF AN ELECTRICAL DISCHARGE ALONG THE ELECTRODE WIRE OF AN EDM APPARATUS

[75] Inventor: Roland Martin, Valleiry, France

[73] Assignee: Charmilles Technologies, S.A., Geneva, Switzerland

[21] Appl. No.: 647,415

[22] Filed: Sep. 5, 1984

[30] Foreign Application Priority Data

Sep. 7, 1983 [CH] Switzerland .................. 4893/83

[51] Int. Cl.$^4$ ............................................. B23H 7/04
[52] U.S. Cl. .............................. 219/69 W; 204/129.2; 219/69 C
[58] Field of Search ............... 219/69 M, 69 P, 69 S, 219/69 W, 69 C; 323/305, 361; 204/129.2

[56] References Cited

U.S. PATENT DOCUMENTS

| | | | |
|---|---|---|---|
| 3,564,339 | 2/1971 | Katz | 219/69 C |
| 4,104,502 | 8/1978 | Ullmann et al. | 219/69 M |
| 4,172,244 | 10/1979 | Zeis | 323/361 |
| 4,193,852 | 3/1980 | Inoue | 219/69 W |
| 4,205,213 | 5/1980 | Inoue | 219/69 W |
| 4,321,450 | 3/1982 | Inoue | 219/69 W |

FOREIGN PATENT DOCUMENTS

| | | | |
|---|---|---|---|
| 52-58195 | 5/1977 | Japan | 219/69 W |
| 52-58194 | 5/1977 | Japan | 219/69 P |
| 53-64899 | 6/1978 | Japan | 219/69 M |

Primary Examiner—C. L. Albritton
Assistant Examiner—Geoffrey S. Evans
Attorney, Agent, or Firm—Hauke & Patalidis

[57] ABSTRACT

In a travelling wire EDM apparatus, the location of an electric discharge along the portion of the electrode wire in the machining zone between the electrode wire and the workpiece, in the course of a cut being effected on the electrode workpiece by electrical discharges, is measured by measuring the currents flowing through each of the two lines connecting one output of the pulse generator associated with the EDM apparatus to the electrode wire on one side and the other of the machining zone. The measured currents are added and subtracted and the position, or location, of an electrical discharge is determined by a signal proportional to the quotient of the difference by the sum of the currents.

4 Claims, 2 Drawing Figures

U.S. Patent Mar. 11, 1986 4,575,605 ately computing circuit, generally designated at 16, provides at its output a value Z' which is equal to the quotient of the difference between the two current values by the sum of the two current values. The value Z' is proportional to the distance Z, or KZ'=Z and the constant, or proportion factor, K is equal to half the length D of the electrode wire 1 between the two contacts 13 and 14.

APPARATUS AND METHOD FOR DETECTING THE LOCATION OF AN ELECTRICAL DISCHARGE ALONG THE ELECTRODE WIRE OF AN EDM APPARATUS

BACKGROUND OF THE INVENTION

The present invention relates to an apparatus and method for detecting the location of an electrical discharge in the machining zone of a travelling wire EDM apparatus.

Travelling wire EDM apparatus are designed to cut an electrode workpiece, by machining electrical discharges, by means of an electrode wire. A pulse generator, providing the machining electrical discharges, is connected across the electrode workpiece. The connection to the electrode wire is generally effected by a pair of electrical conductors supplying the machining current, one conductor being connected to the electrode wire on one side of the machining zone and the other on the other side.

Connecting the pulse generator to the electrode wire by way of a pair of electrical conductors is a necessary expedient for keeping under control the excessive thermal stress imposed upon the electrode wire due to heating caused by the electrical discharges themselves and by the resistive heating of the wire resulting from the flow of machining current through the wire. The heating of the wire, if remaining unchecked, may exceed acceptable limits and cause rupture of the wire, for example if the electrical discharges are concentrated at a specific location along the portion of the wire in the machining zone. Monitoring the concentration of the elecrical discharges by way of detecting the precise location of each electrical discharge permits to prevent electrode wire rupture.

One known method for detecting the location of an electrical discharge which is disclosed in published Japanese patent application No. 53/64899 consists in measuring the resistance of the electrode wire between the location of the electrical discharge and one of the contacts supplying machining current to the electrode wire. Such a method presents the inconvenience of measuring a voltage drop on a portion of the wire, which is a measurement that is very inaccurate due to the low impedance of the circuit in which the measurement is effected.

Another method, also disclosed in the same Japanese patent application publication consists in measuring the voltage unbalance of a Wheatstone bridge, one of the branches of the bridge consisting of the length of wire between the two contacts supplying machining current to the wire, each contact being located on one side of the machining zone. Such a method is practical only if all the electrical discharges occur at the same current level. Otherwise, as is for example the case when the pulse generator is of the relaxation type, which is often the type of pulse generators used in travelling wire EDM apparatus, the intensity of the electrical discharges varies as a function of the triggering voltage of the discharges, and the amplitude of voltage unbalance of the bridge varies as a function of the intensity. Under such circumstances, the known method becomes useless.

SUMMARY OF THE INVENTION

The present invention has for principal object to overcome the disadvantages and limitations of the known method, by providing a circuitry comprising a pair of electrical conductors for supplying machining current to the EDM apparatus electrodes wire on each side of the machining zone.

An arrangement according to the present invention provides means for subtracting and adding the intensities of the currents flowing respectively in each of the lines, in the course of each electrical discharge, and a circuit for obtaining a value which is proportional to the quotient of the subtraction by the addition. The invention provides the principal advantage of effecting very accurate measurements, even though the current level of the electrical discharges is constantly variable.

The diverse objects and advantages of the present invention will become apparent to those skilled in the art when the following description is read in conjunction with the accompanying drawing schematically showing, for illustrative purpose, an example of apparatus according to the invention, and in which:

DETAILED DESCRIPTION OF THE PREFERRED EMBODIMENT

Figure 1:
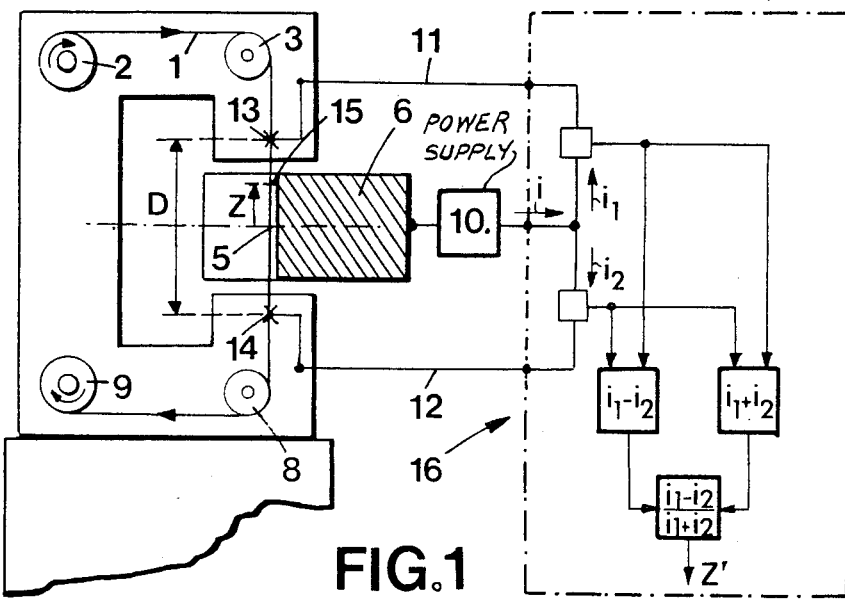
FIG. 1 is a schematic representative of a travelling wire EDM apparatus provided with an arrangement for determining the location of an electrical discharge.

Referring now to FIG. 1 illustrating schematically a travelling wire EDM apparatus, an electrode wire 1 is supplied from a reel or spool 2 and, after passing over a roller or pulley 3, travels through a machining zone 5 wherein it effectuates, by electrical discharges, a cut on a workpiece 6. After being passed over a second roller or pulley 8, the used electrode wire is wound on a reel or spool 9. The EDM apparatus further comprises a pulse generator 10 having a terminal connected to the electrode workpiece 6 and the other connected, via two lines 11 and 12, to the electrode wire 1 by two contacts 13 and 14, one contact being disposed on one side of the machining zone 5 and the other being disposed on the other side of the machining zone, for supplying an appropriate pulsed machining current for cutting the electrode workpiece 6 by electrical discharges.

The location at which occurs an electrical discharge 15 is situated at a distance Z from the mid-distance, or D/2 between the contacts 13 and 14, D being the distance between the contacts or the length of the electrode wire 1 between the contacts. The distance Z is found by resolving the following equation:

$$Z = \frac{D}{2} \times \frac{I_1 - I_2}{I_1 + I_2}$$

$I_1$ being the current flowing through the line 11 and $I_2$ being the current flowing through the line 12.

The currents $I_1$ and $I_2$ are measured, and an appropri-

Figure 2:
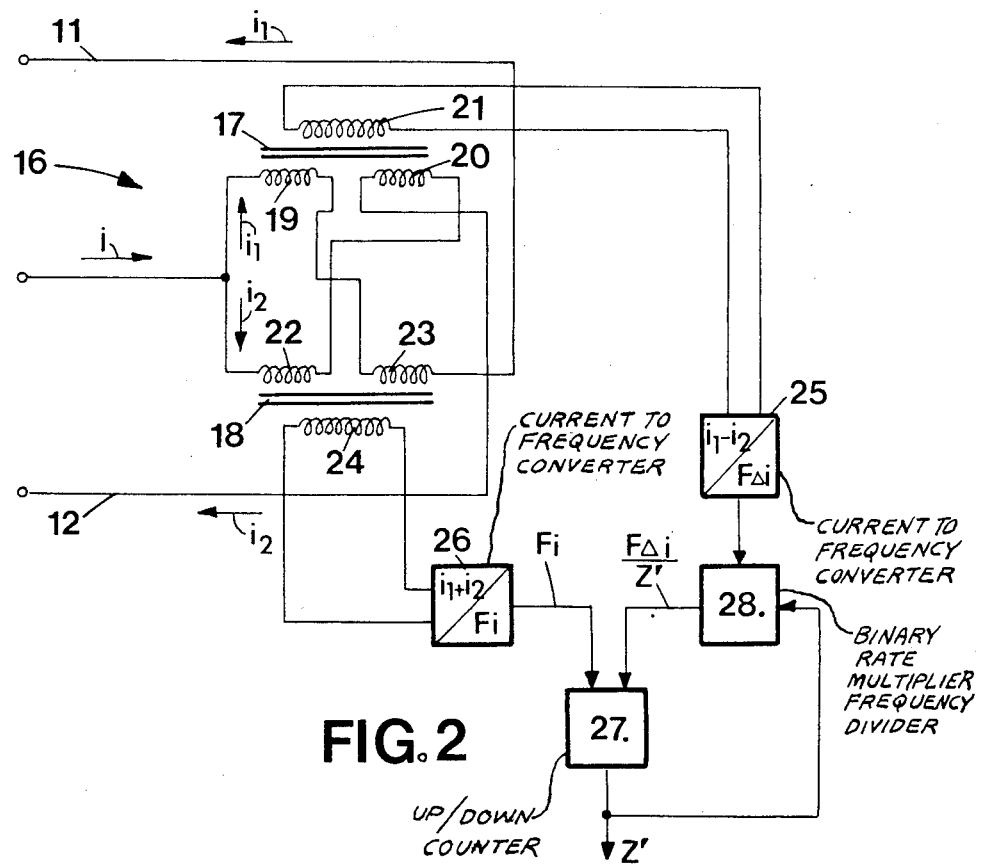
FIG. 2 is an example of circuit diagram for the apparatus of FIG. 1.

As illustrated at FIG. 2, an example of computing circuit 16 comprises two current transformers 17 and 18 for determining the difference between the currents $I_1$ and $I_2$ and the sum of the currents. The primary windings 19 and 20 of the transformer 17 are wound in opposite direction such as to induce in the secondary winding 21 of the transformer 17 a current proportional to the difference between the magnetic fluxes induced by the currents $I_1$ and $I_2$, flowing respectively through the line 11 and the line 12. The primary windings 22 and 23 of the second current transformer 18 are wound in the same direction such that the current in the secondary winding 24 of the transformer 18 is proportional to the sum of the magnetic fluxes induced by the currents flowing through the primary windings, or currents $I_1$ and $I_2$.

The current flowing through the secondary winding 21 is supplied to a current-to-frequency converter 25, and the current flowing the secondary winding 24 is supplied to a current-to-frequency converter 26 for providing output signals respectively of the frequency Fi and the frequency F$\Delta$i.

The output signal of frequency Fi corresponds to the sum of the currents $I_1$ and $I_2$ and is applied to one of the inputs of an up-down counter 27, while the other output signal of frequency F$\Delta$i, corresponding to the difference between the currents $I_1$ and $I_2$, is applied to the input of a frequency divider 28, consisting, for example, of a binary rate multiplier (BRM) circuit. The signal at the output of the frequency divider 28 is applied to another input of the up-down counter 27, and the digital signal at the output of the up-down counter 28 is applied to the control input of the frequency divider 28 to provide its instantaneous division factor. According to the illustrated arrangement, whose individual components are well known in the art, the signal at the output of the up-down counter 27 varies the division factor of the BRM frequency divider 28 until F$\Delta$i=Fi, such that the output signal of the up-down counter 27 remains constant. Under such conditions, $Z'$=F$\Delta$i. It is readily apparent that the signals of frequency Fi and F$\Delta$i are at a frequency much higher than the frequency of the electrical discharges in order to permit obtaining a stable value of $Z'$, during the time intervals between consecutive electro-erosive electrical discharges.

The signal $Z'$ is in turn applied to a warning device, or is used for controlling the machining current.

It will be appreciated that the operations effected by the example of circuit herein illustrated and described could be effected by different circuits. More particularly, signals proportional to $I_1$ and $I_2$ can be added or subtracted by analog means, such signals being provided separately by a current transformer. The sum of the currents $I_1$ and $I_2$ can also be measured directly at the output of the pulse generator 10, FIG. 1, and the difference between the currents measured by measuring the voltage differential between the two contacts 13 and 14 supplying machining current pulses to the electrode wire 1, for example by shunting the two contacts and measuring the current flowing through the shunt.

Having thus described the invention by way of an example of structure well designed for accomplishing the objects of the invention, modifications whereof will be apparent to those skilled in the art, what is claimed as new is as follows:

I claim:

1. An apparatus for detecting the location of an electrical discharge along the length of an electrode wire in the machining zone between the electrode wire and an electrode workpiece in a travelling wire EDM apparatus, said detecting means comprising a pair of electric lines each for supplying machining current to the electrode wire on one side of the machining zone, and a pulse generator connected across the electrode workpiece and said electric lines, means for establishing the difference and the sum of the currents each flowing through one of said lines in the course of each electrical discharge, and means for providing a signal proportional to the quotient of said difference by said sum.

2. The apparatus of claim 1 wherein said establishing means comprises a pair of transformers each having a pair of primary windings, and a secondary winding through one line flowing through one primary winding of each transformer and the current flowing through the other line flowing through the other primary winding of each transformer, said primary windings of one pair being wound in opposite directions and said primary windings of the other pair being wound in the same direction, whereby a current is induced in the secondary winding of one transformer which is the difference of the currents flowing through the primary windings of said one transformer and a current is induced in the secondary winding of the other transformer which is the sum of the currents flowing in the primary windings of said other transformer.

3. The apparatus of claim 2 comprising two frequency converters each for converting current in each secondary winding to a signal of a predetermined frequency, an up-down counter and a frequency divider, one of said signals of predetermined frequency being applied to one of the inputs of the up-down counter and the other signal being applied to a second input of the up-down counter through said frequency divider whose dividing factor is supplied by the signal at the output of the up-down counter.

4. A method for determining the location of an electrical discharge along the length of an electrode wire in the machining zone between the electrode wire and an electrode workpiece in a travelling wire EDM apparatus, said apparatus comprising a pulse generator connected across the electrode workpiece, said pulse generator being connected to the electrode wire by two lines supplying electrical discharge machining pulses to said electrode wire each on one side of said machining zone, said method comprising establishing the difference between the currents flowing each through one of said lines in the course of each electrical discharge, establishing the sum of the currents each flowing through one of said lines in the course of each electrical discharge, and providing a signal proportional to the quotient of said difference by said sum.

* * * * *